May 7, 1940. W. V. BOWLES 2,199,738
TOOL JOINT FOR DRILL STEMS
Filed April 7, 1939 3 Sheets-Sheet 1
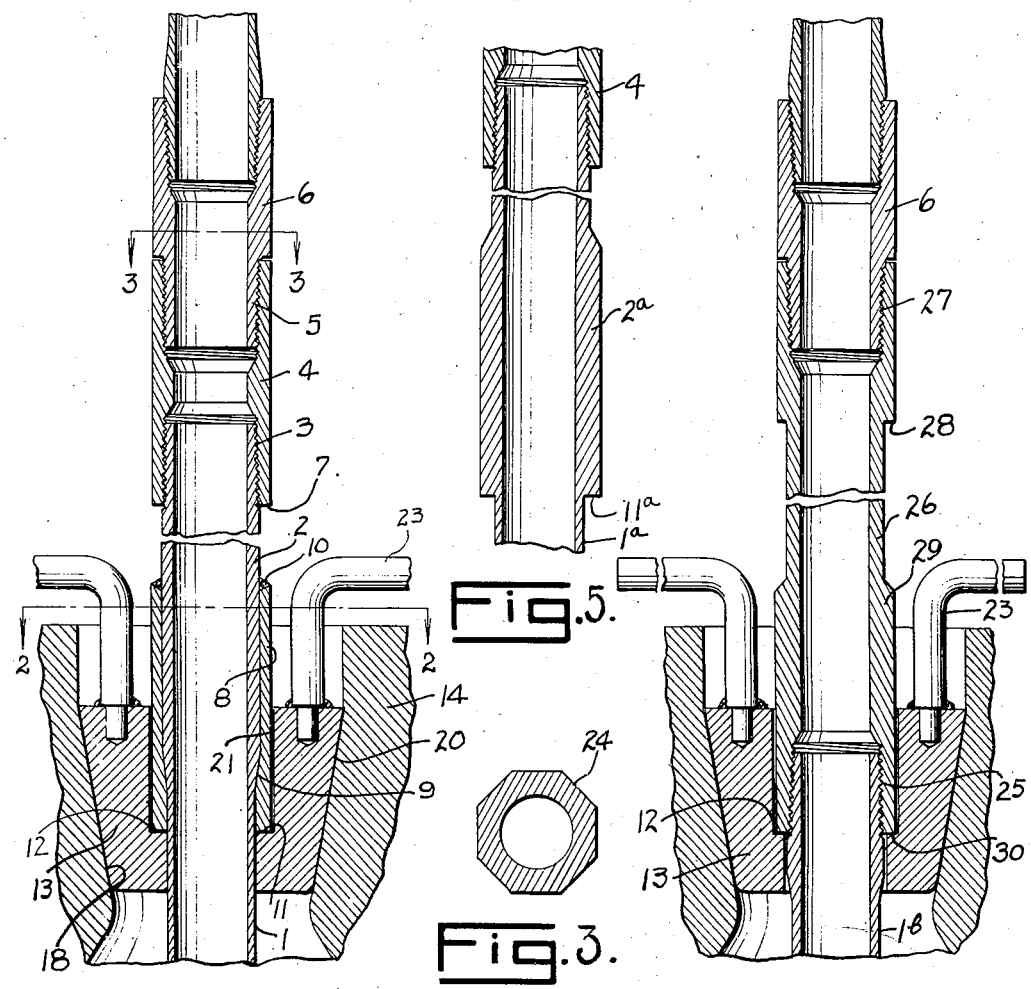
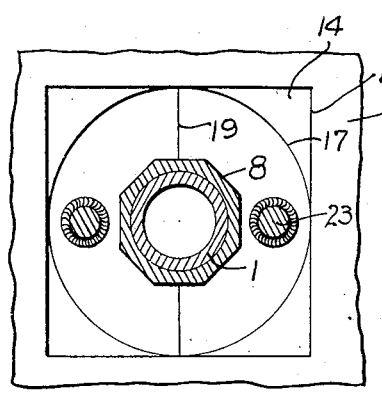
William V. Bowles INVENTOR.
Jesse R. Stone
&
Lester B. Clark
ATTORNEYS May 7, 1940.   W. V. BOWLES   2,199,738
TOOL JOINT FOR DRILL STEMS
Filed April 7, 1939   3 Sheets-Sheet 2
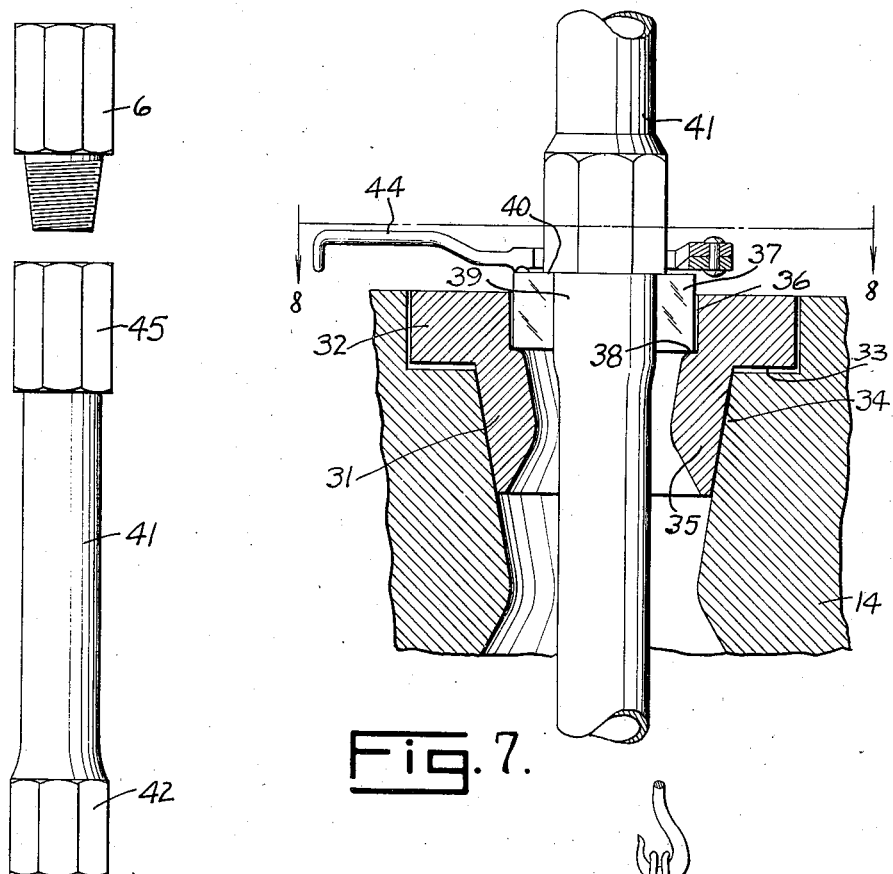
Fig. 7.
Fig. 9.
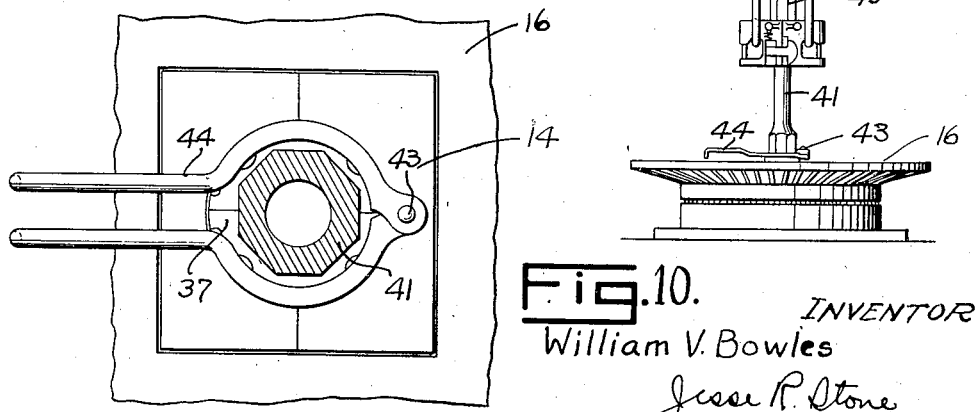
Fig. 8.   Fig. 10.
INVENTOR
William V. Bowles
Jesse R. Stone
Lester B. Clark
ATTORNEYS

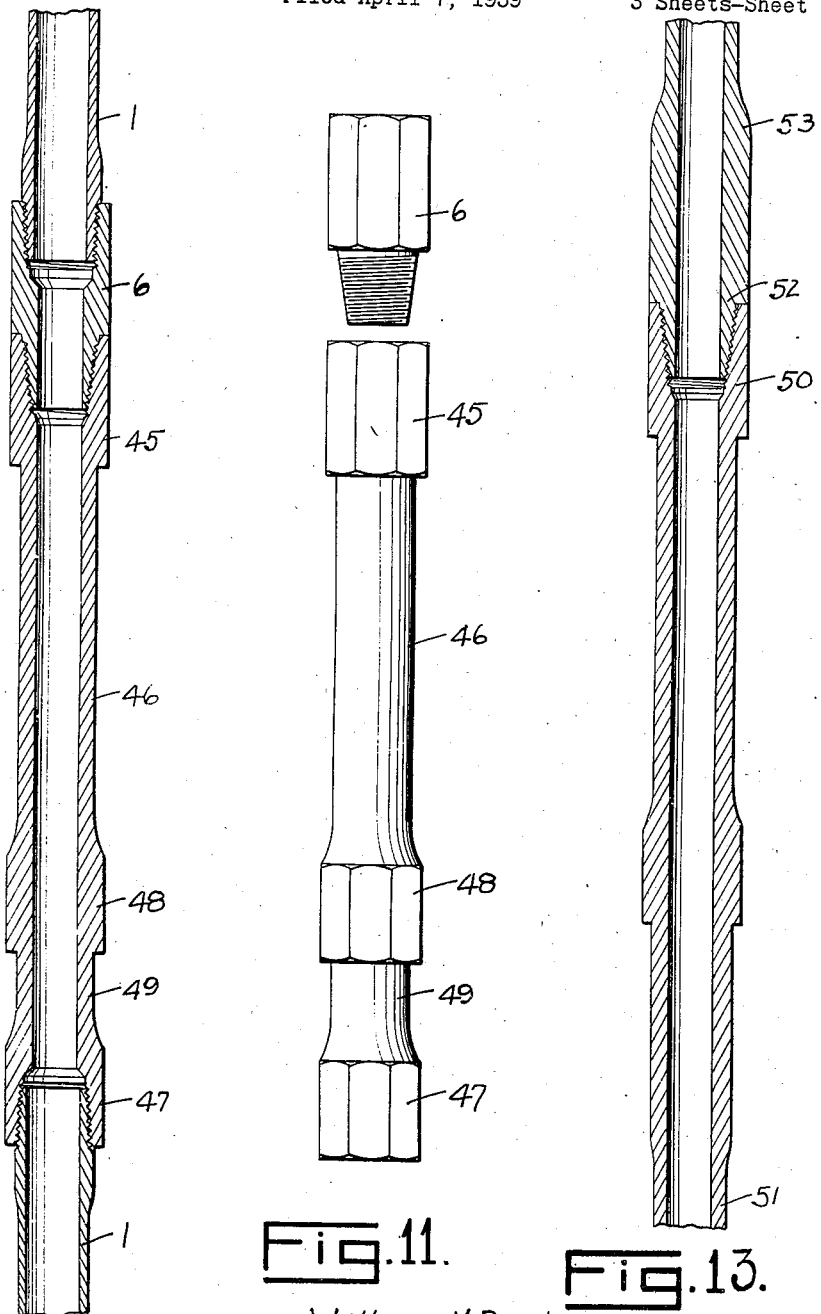

Patented May 7, 1940

2,199,738

UNITED STATES PATENT OFFICE 2,199,738

TOOL JOINT FOR DRILL STEMS

William V. Bowles, Houston, Tex., assignor of twenty-five per cent to Tracy S. Park, Houston, Tex.

Application April 7, 1939, Serial No. 266,487

4 Claims. (Cl. 255—28)

My invention relates to tool joints such as are employed upon drill stems in the operations of well drilling. It also includes the construction of drill stem supporting means whereby the drill stem may be held in the rotary table during the operations of inserting or removing the pipe from the well.

In the drilling of wells by the rotary method it is customary to connect one section of the drill stem to the next adjacent section by tool joints constructed of a good quality of steel which will be capable of screwing up and unscrewing from each other with a minimum amount of wear. Such tool joints are ordinarily of a better quality of steel than the drill stem sections but must not be so hard as to prevent a grip thereon by the ordinary type of pipe tongs.

In drilling operations the sections of pipe are coupled together in units of three or four sections of drill pipe so that they can be handled more expeditiously. These units are ordinarily termed "threeables" or "fourables," depending on the number of sections handled together as a unit. These sections have a male or pin joint member at the lower end and a female or box joint member at the upper end. When the drill stem sections are being assembled for insertion of the drill stem and drill into the well, the sections that have been introduced are supported by slips while each new section is connected thereto. The rotary table is equipped with a tapered bowl or bushing into which slips are inserted to clamp against the pipe and hold it against downward movement. These slips are tapered on their outer faces and toothed on their inner faces adjacent the pipe and are wedged downwardly into the bowl by the weight of the pipe so that a firm grip is obtained upon the drill stem then in the well to prevent its dropping.

In modern drilling it is becoming common to drill wells in excess of ten thousand feet in depth. In such wells the weight of the drill stem which must be suspended upon the slips becomes enormous and the slips must obtain a firm grip upon the pipe to prevent its dropping. In handling the pipe the tool joint at the upper end of the fourable must extend above the rotary table to be engaged by the elevators employed in handling the pipe. This necessitates the pipe being supported below the tool joint upon slips of the character described. It is found that the teeth upon the slips which are clamped frictionally against the pipe tend to mutilate the surface of the pipe and the excessive weight supported by the slips tends to exert a crushing action upon the pipe. This is somewhat similar to the action of a compression die employed in reducing the diameter of the tubular sections. The walls of the pipe are compressed so that its diameter is sometimes materially decreased at the point where the slip engages the pipe.

The main purpose of my invention is to provide a tool joint, either integral with the pipe or separate and replaceable, the lower or box half being provided with downwardly projecting shoulders, beneath which elevators or bushing type slips may be engaged, to hoist, lower, or support the drill stem in drilling operations. This method does away with tongs, elevators or slips being brought in contact with the easily damaged wall of the pipe, resulting in longer life and usefulness of the pipe and reducing the hazard of the pipe breaking or twisting-off during drilling operations.

It is a further object of the invention to provide a tool joint which is polygonal on its outer periphery where the wrench may be engaged therewith; thus permitting the joint to be of steel hard enough to resist the usual multilation due to the action of the wrench. In the usual cylindrical form of joint the steel must not be so hard that the teeth or inserts on the wrench will not cut into the metal of the joint sufficiently to hold the joint from turning relative to the wrench. By using a polygonal joint a wrench with fixed jaws may be used and the clamping action of the old type of tongs is avoided.

It is also an object of the invention to provide a tool joint which is comparatively long and rigid, so as to assist in maintaining a straight hole in drilling.

It is also an object to do away with the old type of slips which are frictionally clamped to the pipe and to provide a comparatively light supporting slip or tongs which provide a shoulder upon which the tool joint may engage without being compressed.

I also desire to so form the outer contour of the tool joint that the elevators may be easily released therefrom in use.

In the drawings herewith, I have shown several embodiments of the invention. Fig. 1 is a broken central longitudinal section illustrating one form of construction which may be employed in carrying out the invention.

Fig. 2 is a top plan view in section on the line 2—2 of Fig. 1.

Fig. 3 is a transverse section on line 3—3 of Fig. 1.

Fig. 4 is a section similar to Fig. 3 but illustrating the matching up of one section of joint relative to the adjacent section.

Fig. 5 is a broken detail illustrating how the device shown in Fig. 1 may be made by an upset integral with the pipe itself.

Fig. 6 is a longitudinal section similar to Fig. 1 and illustrating a different embodiment of tool joint.

Fig. 7 is a sectional view partly in elevation illustrating a different embodiment of the supporting means for the drill stem.

Fig. 8 is a transverse section on the line 8—8 of Fig. 7.

Fig. 9 is a side elevation showing the two parts of the tool joint constructed similar to that shown in Fig. 6.

Fig. 10 is an assembly view showing the manner in which the elevators may engage the tool joint.

Fig. 11 is a side elevation of a tool joint constructed slightly different from that shown in Fig. 9.

Fig. 12 is a longitudinal section through a tool joint such as is disclosed in Fig. 11 with the pipe sections connected therein.

Fig. 13 is a longitudinal section through a tool joint embodying this invention and shown as formed integral with the drill pipe.

To avoid the necessity of supporting the pipe in the rotary table by means of the conventional slip jaws it is a feature of the invention to provide upon the tool joint or upon the drill stem, closely adjacent the tool joint, a shoulder which may rest upon a support without the necessity of any compression of the pipe. In Fig. 1 I have shown a section of drill stem 1 which is upset toward the end thereof, as shown at 2, and threaded at 3 to engage with the box member 4 of a tool joint. This tool joint is of old construction having a coarsely threaded box or socket to engage with the tapered threaded end 5 of the pin member 6 of the joint. This tool joint must be supported in position above the rotary so that the elevator may be engaged below the shoulder 7 upon the lower end of the tool joint.

To support the tool joint in this position I contemplate placing upon the upset end of the drill pipe section a sleeve 8, which fits closely about the drill stem and is upset at 9 toward the lower end thereof to engage below the upset portion 2 upon the pipe. This sleeve is held rigidly in this position upon the pipe by a bond of welding material 10 around the upper end of the sleeve, said bond serving to secure the sleeve rigidly to the pipe in what is substantially an integral connection. The lower end of the sleeve 8 thus mounted upon the pipe forms a shoulder at 11 which may engage with a supporting shoulder 12 upon a tapered bushing 13 on the split bushing 13 in the rotary table.

As will be seen from Fig. 2, the bushing 14 is rectangular in shape and fits within a squared opening 15 in the rotary table 16. It is formed with a circular opening 17 therein which, as will be seen from Fig. 1, is cylindrical for a short distance and then is tapered downwardly at 18 to receive the bushing 13.

The said bushing 13 is made up of two sections which engage together along their meeting sides at 19 and have an outer tapered surface 20, which fits within the tapered seat 18. On their inner faces the two halves of the supporting bushing are formed with a polygonal recess 21 to fit about the outer periphery of the sleeve 8, which, as will be seen from Fig. 2, is also polygonal on its outer surface, as will be later noted.

Each of the supporting members 13 are formed with handles 23 which extend up above the rotary table and are curved laterally so that they may be conveniently engaged to raise the supporting bushing 13 from its seat.

Both the tool joint members 4 and 6 are formed polygonal on their outer periphery. As will be seen from Fig. 3, I form them preferably in octagonal shape and thereby providing opposite flat sides 24 so that the joint may be conveniently engaged by a pipe wrench having fixed jaws which may be inserted into position engaging against the opposite sides of the joint.

It is not common to have one portion of the tool joint screwed into the adjacent tool joint so that the flat sides of both the members of the joint will be axially aligned. In Fig. 4 it will be noted that as a matter of fact they may be entirely out of alignment with each other. The outer surface of the sleeve 8 is also octagonal, as has been previously noted, and it will be obvious that the tool joint may be held against rotation relative to the wrench or holding means when unscrewing or screwing up of the tool joint is desired.

While the tool joint is supported in spaced position above the rotary by the means described relative to Fig. 1, it is obvious that the pipe itself may be formed with the upper end upset in such manner as to provide a supporting shoulder 11a adapted to engage with the supporting bushing. In Fig. 5 such a shoulder is formed upon the pipe section 1a. Above the upset portion 2a of this pipe the pipe is threaded for engagement with the tool joint member 4 as in the previous embodiment. It will thus be possible to support this tool joint in spaced relation above the rotary in the same manner as is shown in Fig. 1.

In Fig. 6 I have shown the supporting shoulder as formed upon the tool joint itself. In this construction the pipe section 1b is formed with the metal upset thereon toward the upper end, which is threaded at 25 for engagement with a tool joint member 26. This tool joint member is formed with an elongated box member, the lower end of which is threaded at 25 to the drill stem section as previously noted, and the upper end is formed into a tool joint box 27 adapted to engage with the pin member 6. At a point spaced from the box 27 the tool joint is formed with a shoulder 28 beneath which the elevators may be engaged. The lower end of the tool joint is again upset at 29 to form a heavy supporting wall having at the lower end thereof a shoulder 30 to seat upon the supporting ledge or shoulder 12 in the supporting bushing. The box member of the joint may be of any desired length but it is contemplated that there shall be space between the shoulder 28 and the upper end of the upset portion 29 to freely accommodate the elevators without interference from the rotary table. It will be understood that this joint is made polygonal, and preferably of octagonal shape as in the previous embodiment, so that the ordinary stationary jaw wrench may be employed thereon.

The supporting bushing which has been shown at 13 in Figs. 1 and 6 need not be constructed in the manner there shown. In Fig. 7, I have shown a somewhat different embodiment in which the bushing 31 is formed with a squared upper end at 32 to fit within the recess 15 in the rotary table. This recess is of shallow depth and has a lower shoulder 33 thereon below which the opening through the bushing is tapered at 34 to receive the tapered lower end 35 of the supporting bushing. This bushing has a recess 36 on its inner surface to receive a split ring 37 which supports the drill pipe. The lower end of the recess 36 has a shoulder 38 upon which the split ring 37 may rest. Below this shoulder the opening through the bushing is tapered somewhat and then is flared downwardly.

The ring 37 is split diametrically so that it may be assembled in position around the upper end 39 of the drill stem section. The upper end of the ring forms a shoulder 40 against which the tool joint 41 may engage.

The ring 37 is connected with a handle device, which is shown best in Fig. 8. It comprises two handle members hinged together at 43 and curved to conform to the curvature of the ring and connected therewith so that said ring may be engaged about the pipe quickly when the drill stem is to be supported in the rotary. It will be noted that the construction of the ring and the handles 44 connected therewith is comparatively light so that one of the operators can handle the same without assistance. This is of material advantage in performing the operations of removing from or inserting the pipe into the well as rapidly as possible.

In this construction the tool joint 41 is similar to the joint disclosed in Fig. 6. However, the lower end 42 which is made polygonal is somewhat shorter in length for the reason that it stands up above the rotary table as here indicated. The upper end of the box member of the joint shown at 45 is spaced above the rotary in a position where it can be readily engaged by the elevator or by the pipe wrench. This will be understood more clearly from the view shown in Fig. 10.

As will be noted each of these tool joints is curved outwardly from cylindrical portion 41 to the lower polygonal portion 42 as shown at 41$a$ to allow for ready release of the elevators as they are unlatched and dropped downwardly.

It is obvious that my inventive idea may be changed in various ways without departing from the spirit of the invention. In Figs. 11 and 12 I have shown the box member 46 of the tool joint as being formed with a lower octagonal portion 47 to engage with the upper end of the pipe section and a second octagonal portion 48 spaced from the member 47 to provide between them an area 49 about which the supporting member may be engaged or, if necessary, elevators may be employed. The upper end of the joint member is formed into the box member of the tool joint as in the previous embodiment.

In Fig. 13 the structure of the joint is still further modified so that the box member 50 of the joint becomes integral with the pipe section 51, upon which it is formed. Also, the pin member 52 is formed upon the upset end 53 at the lower end of the next upper pipe section.

It will be clear from the description of the drawings that I have provided a tool joint which may be supported in the rotary table during the time a tool joint is being screwed up, or unscrewed, in such manner that there is no crushing strain placed upon the pipe. The shoulder upon the tool joint rests upon a shoulder in the supporting bushing. There is a shoulder above the rotary table, which is in position to be readily engaged by the elevators and it will be seen that the structure is such that the drill stem may be handled without danger of dropping and that the ordinary slip now employed will be unnecessary. It is possible to adapt the ordinary type of pipe and tool joint to this use by forming the shoulder upon a sleeve secured to the pipe. However, it is a preferred form of my invention to provide a tool joint having thereon an upper shoulder spaced from the lower section of pipe which may be engaged by the elevators and thus provide a shoulder at the lower end of the tool joint which may rest upon the supporting bushing.

The shoulders provide a support which avoids the necessity of slips which compress the tubular sections when the drill pipe is being hoisted or supported.

In this construction I not only avoid the mutilation of the pipe by the slips now generally employed but I am enabled to form the joint of exceedingly hard material which is adapted to resist strain and abrasion. Due to the fact that the tool joint is polygonal on its outer surface to be engaged by a wrench with fixed jaws the joint may be hard without interfering in any manner with the firm engagement thereof by the wrench. The use of a wrench with fixed jaws also enables the operator to connect and disconnect the sections more rapidly. The joints are made up tighter and yet are more easily broken. No manipulation of the wrench to latch or unlatch the wrench jaw need be performed in engaging the wrench upon the joint. As the wrench, elevators and supporting bushings all engage with the joint and not with the pipe, the wall of the pipe will not be injured by operation of handling.

By forming the tool joint in elongated form as has been described the drill stem itself is made more generally rigid. The tendency of the pipe to bend or to be distorted in drilling is largely minimized so that drilling a straight hole is facilitated. The tool joint becomes a material part in the length of the drill stem and will tend to engage the wall of the well and hold the drill stem in vertical alignment. Also the octagonal areas, having the downwardly presented shoulders of extremely hard steel, will present a maximum of resistance to wear and act, in drilling, to ream the hole to some extent. The well bore is rarely straight. There are bends and crooks at different depths in the bore which cause a flexing of the drill stem in rotation. The polygonal joints bear against the walls at the bends and as they work downwardly tend to wear the hole more nearly straight. Thus the tool joints not only reduce the bends in the bore but, if bends occur, the joints tend to ream and wear the bends more nearly straight.

The pipe is thus protected from material wear and it is possible for it to last the life of several sets of tool joints, the latter being replaced in the field at the well when the old ones become worn thin from long use.

What is claimed as new is:

1. A drill stem section, a tool joint box member at the upper end thereof, polygonal enlargements at the upper and lower ends of said box to be engaged by a wrench, an intermediate polygonal enlarged member spaced upwardly adjacent said lower end similar in length to that of said lower end enlargement for engagement by a wrench, shoulders on the lower sides of said enlargements, and a cylindrical body between said enlargements to receive elevators and other supporting devices.

2. In combination, a drill stem section, a tool joint box member at the upper end thereof, said member being upset at its ends with a cylindrical area of smaller diameter between the upset portions, shoulders presented downwardly on said upset portions, and a rotary table having an opening therein through which said drill stem section extends, a supporting bushing in said table having a polygonal recess to receive said box member and prevent relative rotation, and a shoulder at the lower side of said recess to be engaged by the lower end of said box member and support said drill stem.

3. A tool joint including a tapered threaded pin member, a box member having an elongated body with upset enlargements at its upper and lower ends, a third enlargement spaced from the lower end, said enlargements being polygonal and slightly elongated to be engaged by a wrench, each enlargement having a lower shoulder extending at right angles to the axis of the joint, and both upper and lower upset portions having a taper-threaded socket.

4. A drill stem section, tool joint members at the upper and lower ends thereof, a polygonal enlargement on said pipe, a shoulder of larger diameter than that of the pipe presented downwardly on said enlargement at a point on said pipe spaced below said upper tool joint member to provide space between said tool joint member and said enlargement to be engaged by elevators, and a bushing adapted to be supported in a rotary table, said bushing having a polygonal opening to receive said drill stem and a polygonal support to engage said shoulder and prevent rotation of said drill stem.

WILLIAM V. BOWLES.